United States Patent
Ho et al.

(10) Patent No.: US 6,959,991 B2
(45) Date of Patent: Nov. 1, 2005

(54) INTEGRATED PROJECTOR

(75) Inventors: Francis Ho, Taipei (TW); Minglu Chen, Taipei (TW); Ray Chiu, Taipei (TW); Kevin Kao, Taipei (TW); Jin Fu Sun, Taipei (TW); Bear Tsai, Taipei (TW); Chao Kuan Wu, Taipei (TW); Jason Mar, Taipei (TW); David Li, Taipei (TW); Henry Chien, Taipei (TW); Johnson Yang, Taipei (TW); Alex Chung, Taipei (TW); Yu-Chin Li, Taipei (TW); Chang Te Yang, Taipei (TW)

(73) Assignee: Meiloon Industrial Co., Ltd., Taipei (TW)

( * ) Notice: Subject to any disclaimer, the term of this patent is extended or adjusted under 35 U.S.C. 154(b) by 0 days.

(21) Appl. No.: 10/721,328

(22) Filed: Nov. 26, 2003

(65) Prior Publication Data

US 2005/0024604 A1 Feb. 3, 2005

(30) Foreign Application Priority Data

Aug. 1, 2003 (TW) ........................................ 92214040 U

(51) Int. Cl.$^7$ .............................................. G03B 21/14
(52) U.S. Cl. ...................................... 353/119; 353/122
(58) Field of Search ................................. 353/119, 122

(56) References Cited

U.S. PATENT DOCUMENTS

| | | | | |
|---|---|---|---|---|
| 5,300,942 A | * | 4/1994 | Dolgoff | 353/122 |
| 6,203,160 B1 | * | 3/2001 | Ho | 353/84 |
| 6,388,881 B2 | * | 5/2002 | Yamauchi et al. | 361/704 |
| 6,466,369 B1 | * | 10/2002 | Maddock | 359/460 |
| 6,733,142 B1 | * | 5/2004 | Young et al. | 353/122 |
| 2004/0017548 A1 | * | 1/2004 | Denmeade | 353/31 |
| 2004/0041989 A1 | * | 3/2004 | Olson et al. | 353/122 |

* cited by examiner

*Primary Examiner*—Christopher Mahoney
(74) *Attorney, Agent, or Firm*—Troxell Law Office, PLLC

(57) ABSTRACT

An integrated projector comprising a body with a projector circuit internally and a projection lens externally, a card reader installed on the body to read the data inside the memory card, a video interface installed on the body to receive video signals, and a video player that is a DVD player built-in inside the body. Users can read the data in the memory card, watch TV and watch DVD with a single projector without extra wiring.

5 Claims, 6 Drawing Sheets

INTEGRATED PROJECTOR

BACKGROUND OF THE INVENTION

I. Field of the Invention

This invention relates generally to a projector and, more specifically, to an integrated projector that can work independently without extra wiring for users to read the data in the memory card, to watch TV and to watch DVD.

II. Description of the Prior Art

Heretofore, it is known that people ask for more and more high entertainment quality, many families have home theater equipment; the early day projectors were very bulky in size and very high in cost to be accepted by regular families. By the improvement of manufacturers, now the projectors have tiny internal electronic circuit and smaller in overall size, the price is much lower for general public to accept.

As in Taiwan Utility Model patent publication no. 5200411, an off-axis LCD projector compromises of a light source, an X-type dichroic filter device, a color combination device, three polarizers and three LCD, three polarized analyzers corresponding to three polarizers. The light source is separated into red, green and blue beams by dichroic filter device, each light beam injects to the corresponding LCD of the direction defined by each polarizer; each LCD adjusts and reflects the injected light beam to the corresponding polarized analyzers. The major character of this invention: the directions of the polarizers are vertical to the injected light beam, the directions of the polarized analyzers are vertical the adjusted light beam.

Even the most advanced design, the current projectors can only output image, as shown in FIG. 1, the projector must be connected to a computer or a TV tuner, if users want to watch TV, the extra wiring is needed to connect projector, TV tuner and other audio devices; if users want to output computer images, extra wiring also have to be connected between projector and computer. Users cannot see the pictures of digital cameras from projector; the picture images have to be downloaded into a computer then output from the projector. The audio output needs more wiring, the installation might not be a problem for general people, and however it might be too complex for senior or younger people and those inexperienced.

SUMMARY OF THE INVENTION

It is therefore a primary object of the invention to provide an integrated projector in which users can read the data in the memory card, watch TV and watch DVD with a single projector without extra wiring.

In order to achieve the objective set forth, a integrated projector in accordance with the present invention comprises a body with a projector circuit internally and a projection lens externally, a card reader installed on the body to read the data inside the memory card, a video interface installed on the body to receive video signals, and a video player that is a DVD player built-in inside the body.

BRIEF DESCRIPTION OF THE DRAWINGS

The accomplishment of the above-mentioned object of the present invention will become apparent from the following description and its accompanying drawings which disclose illustrative an embodiment of the present invention, and are as follows.

DESCRIPTION OF THE PREFERRED EMBODIMENT

Figure 1:
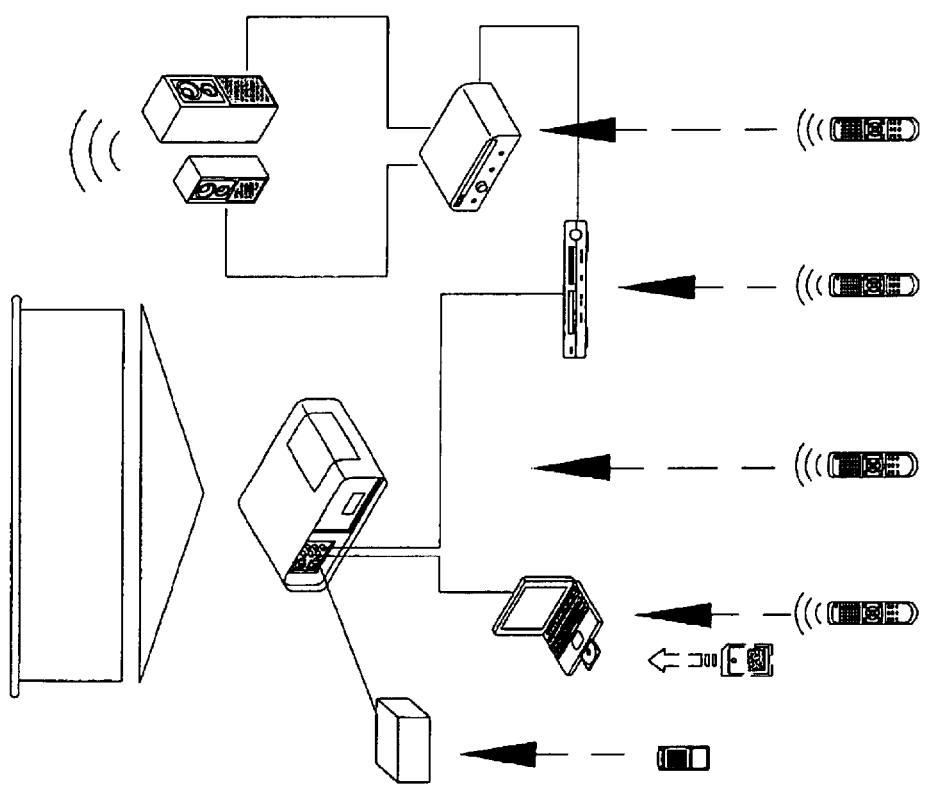
FIG. 1 is an application view of the prior art.

Referring to FIG. 2 to FIG. 6, the present invention is composed of a body 1, a card reader 2, a video interface 3 and a video player 4. The functions of each component are described below:

The body 1 has a projector circuit 11 internally and a projection lens 12 externally.

The card reader 2 is installed on the body 1 to read the data inside the memory card 21.

The video interface 3 is installed on the body 1 to receive video signals.

The video player 4 is a DVD player built-in inside the body 1.

The body 1 combines all the required equipment internally and directly that results in smaller physical size; with the shared circuitries that reduces the individual shells needed originally, the cost is also lower, the operation is also simpler without external wires, the operation is friendly to all ages of people. Users can read the data in the memory card 21, watch TV and play DVD with the single projector.

Figure 2:
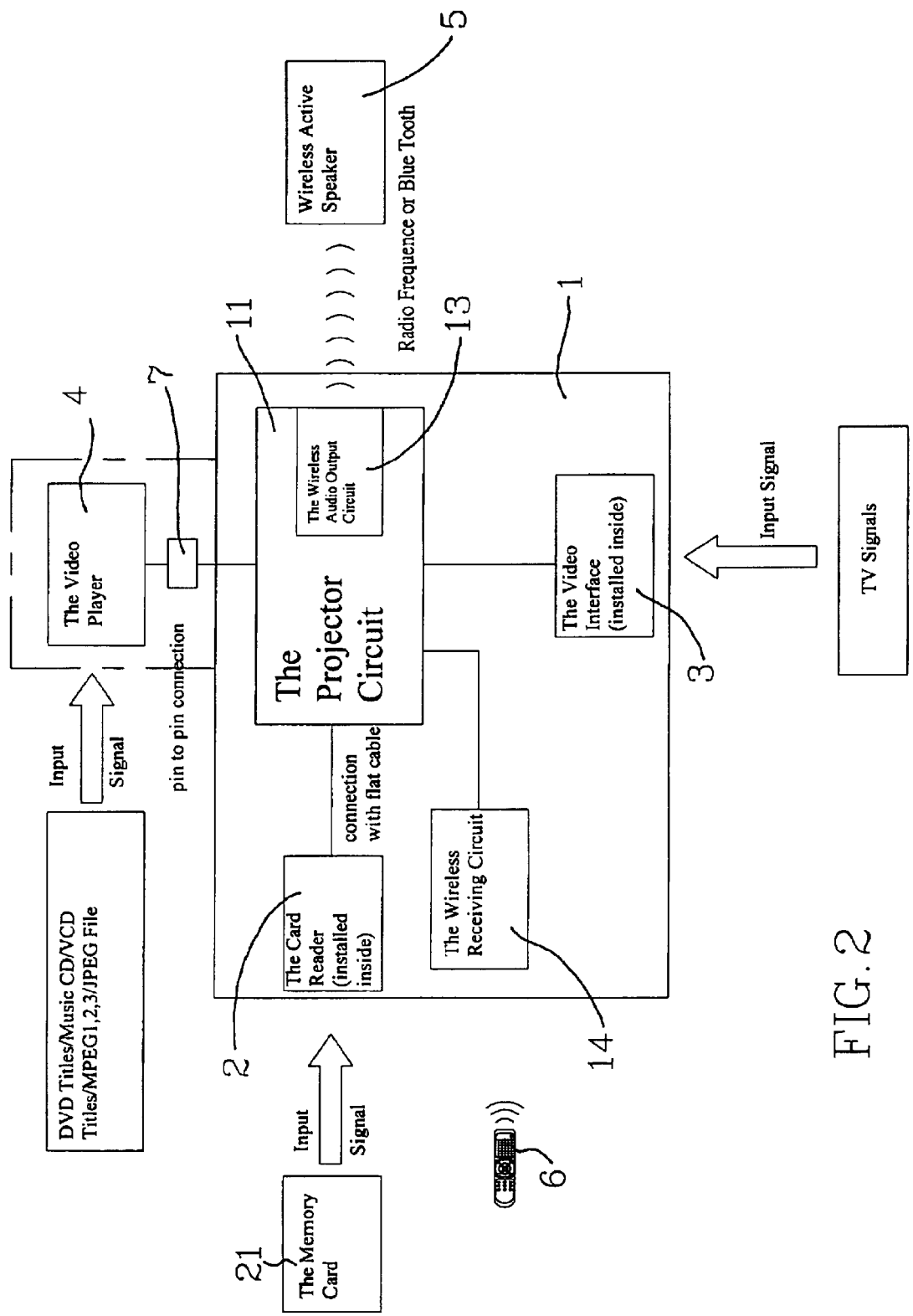
FIG. 2 is a block diagram of the present invention.
Figure 3:
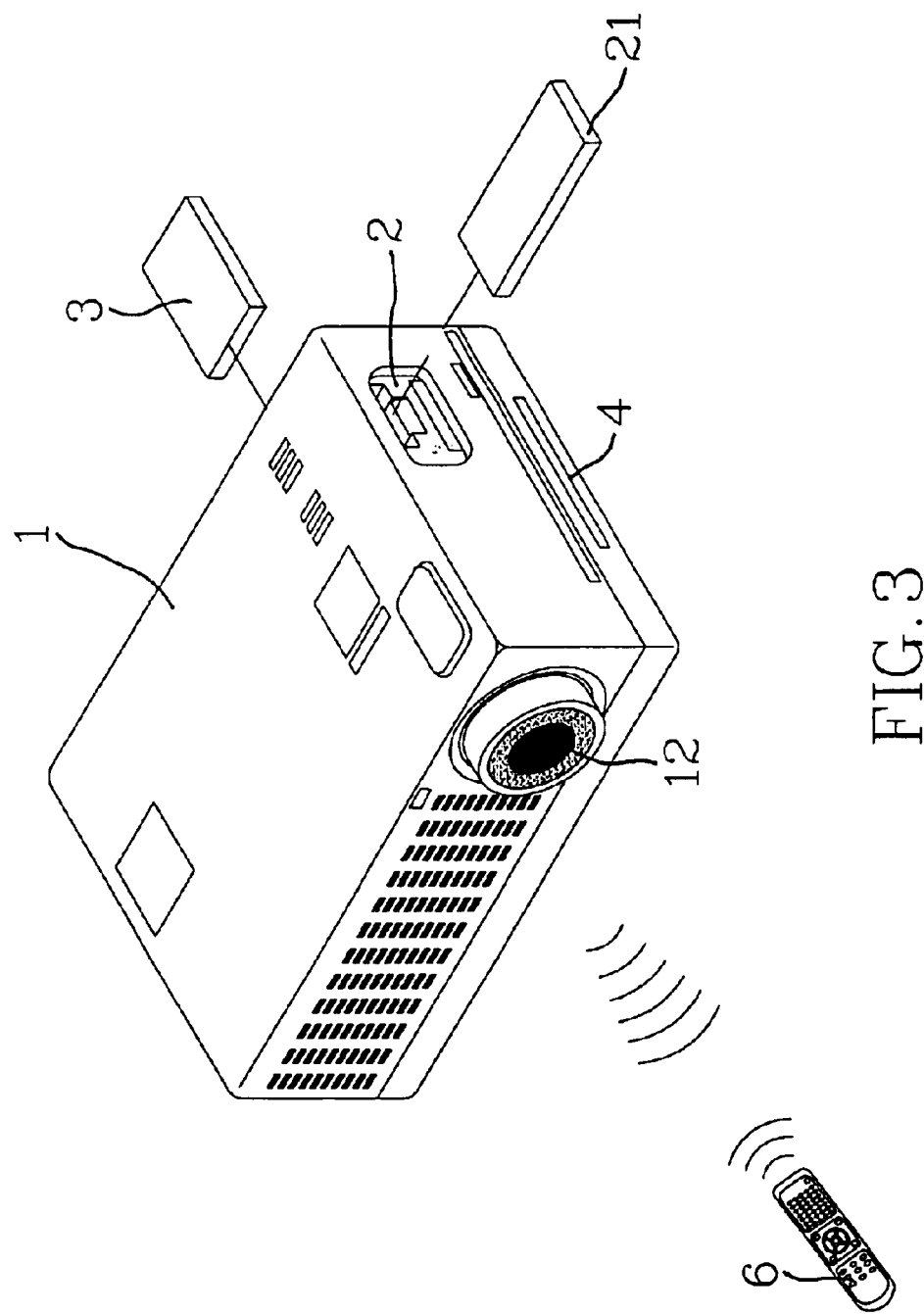
FIG. 3 is a perspective view of the present invention.
Figure 4:
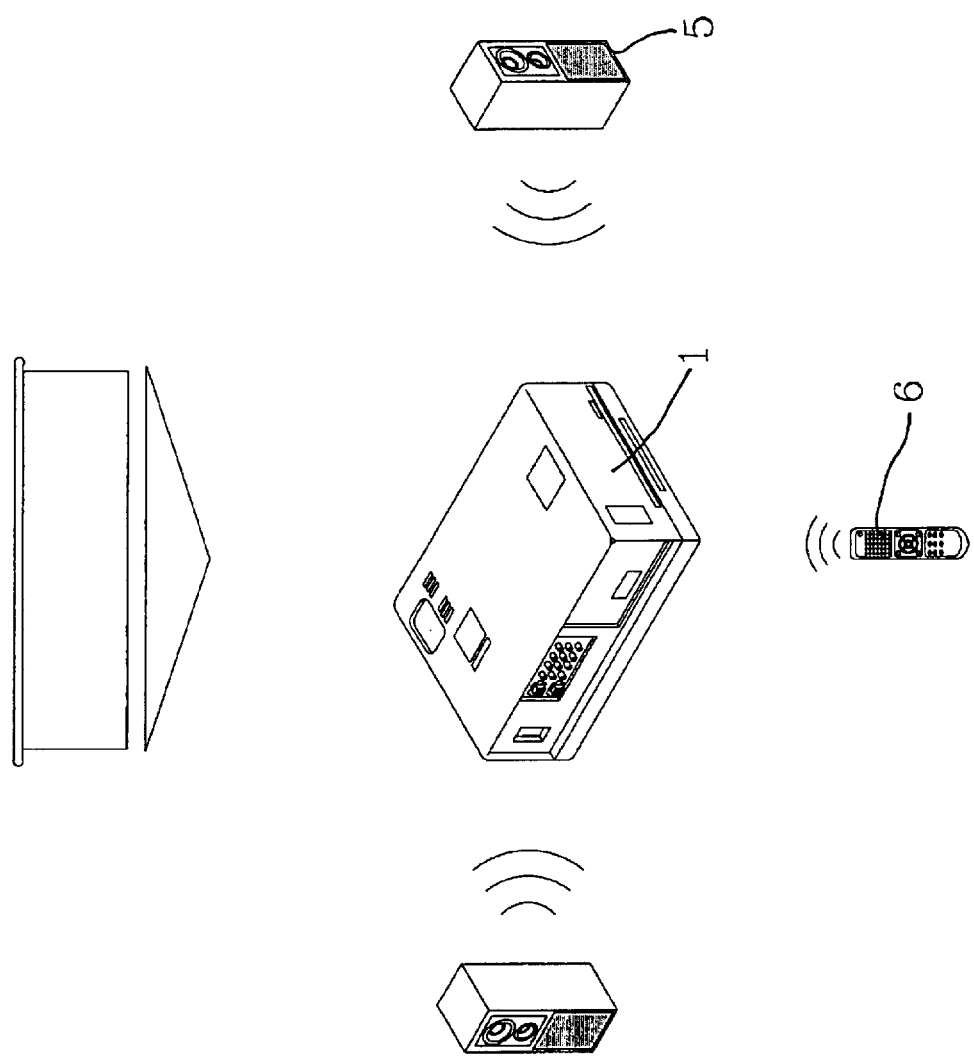
FIG. 4 is a an application view of the present invention.

Referring to FIG. 2 to FIG. 4, for the convenience of users, the body 1 installs a wireless audio output circuit 13, such as an audio frequency module or a Bluetooth wireless transmission module (not shown in FIG); the wireless active speaker 5 are installed externally for much more flexibility in space panning; the speakers can be anywhere without the limitation by wiring. A wireless receiving circuit 14 is inside the body 1 to receive the commands from a remote controller 6, users can control the body 1, the card reader 2, the video interface 3, the video player 4 and the wireless active speaker 5 wirelessly, such scheme improves the poor planning of the prior art with too many remote controllerlers.

Figure 5:
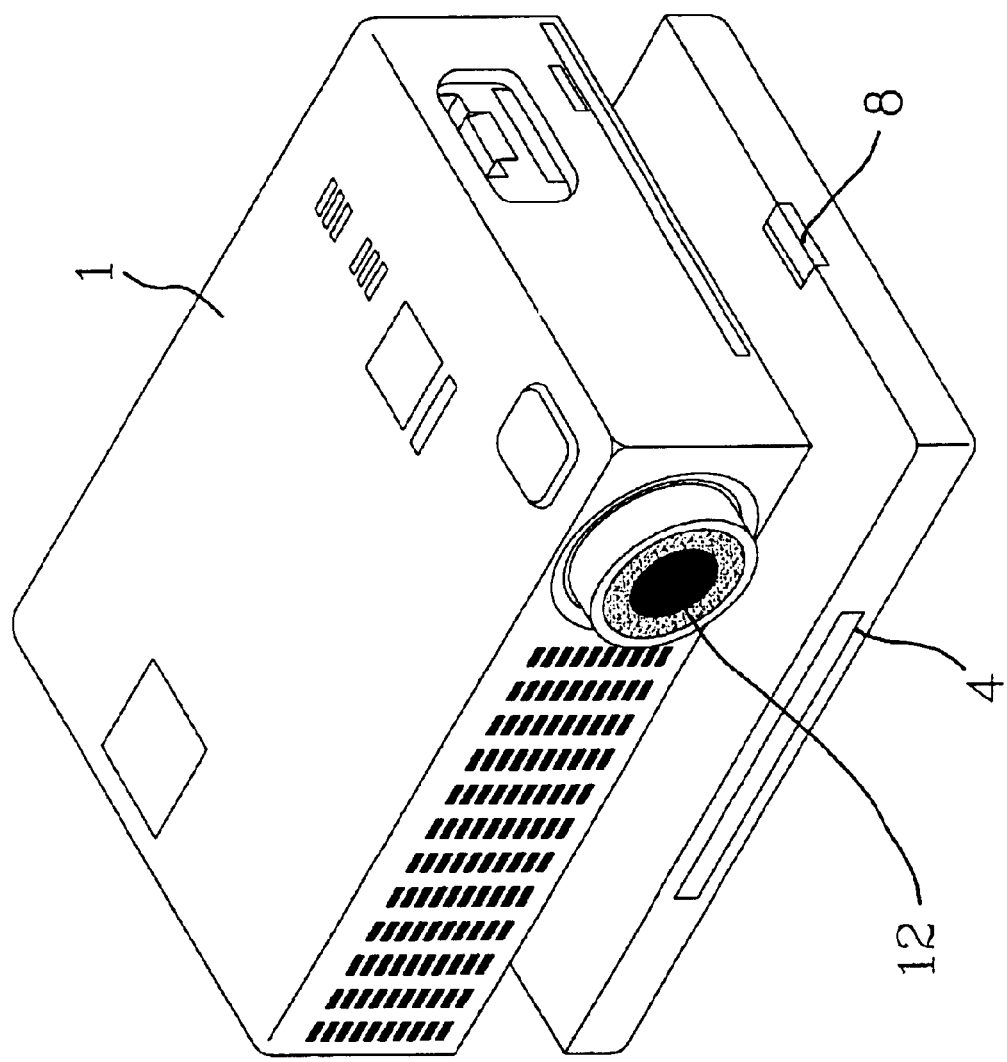
FIG. 5 is an assembly view of another application in accordance with the present invention.
Figure 6:
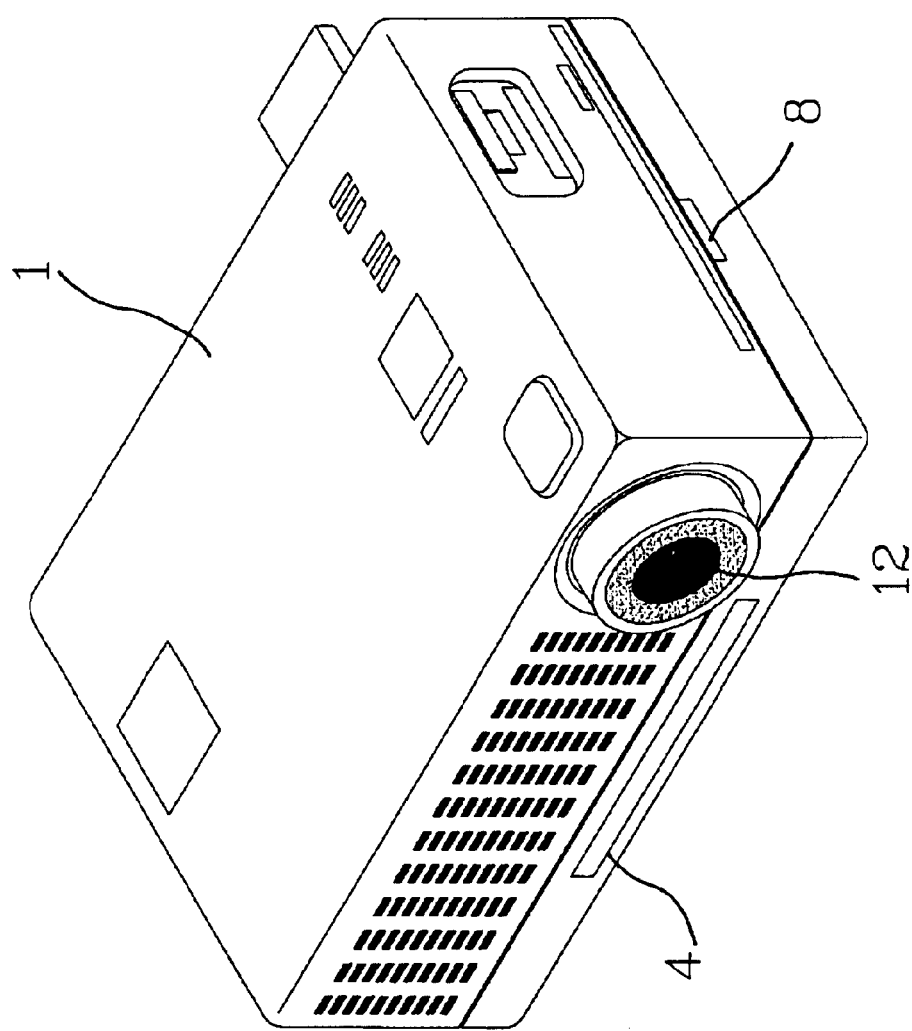
FIG. 6 is a perspective view of another application in accordance with the present invention.

Referring to FIG. 2, FIG. 5 and FIG. 6, the video player 4 of the present invention can also be separated from the body 1, the external DVD player is connected to the body 1 with a connector and fastened to the body 1 with a fastener 8; the independent video player 4 can connects to other display apparatus by users for more selections to buy the DVD player separately.

While a preferred embodiment of the invention has been shown and described in detail, it will be readily understood and appreciated that numerous omissions, changes and additions may be made without departing from the spirit and scope of the invention.

What is claimed is:

1. An integrated projector comprising:
   a) a body having a projector circuit located on an interior thereof and a projection lens protruding externally from the body;
   b) a video interface connected to the body and receiving video signals;
   c) a video player connected to the body;
   d) a wireless audio circuit located on the interior of the body and a plurality of wireless speakers, the wireless audio circuit controlling the plurality of wireless speakers;

e) a wireless receiving circuit located on the interior of the body, the projector circuit being electrically connected to the video interface, the video player, the wireless audio circuit, and the wireless receiving circuit; and f) a remote controller controlling the projector circuit through the wireless receiving circuit to control the video interface, the video player, and the wireless speakers.

2. The integrated projector according to claim 1, wherein the video player is a DVD player.

3. The integrated projector according to claim 1, wherein the video player is integrally connected to the body.

4. The integrated projector according to claim 1, wherein the video player is removably connected to the body.

5. The integrated projector according to claim 1, further comprising a card reader connected to the body and reading data from a memory card, the card reader is electrically connected to the projector circuit, the remote controller controlling the card reader through the projector circuit.

* * * * *